CALUTRON RECEIVER

Filed Aug. 1, 1946 7 Sheets-Sheet 1

INVENTOR.
SIDNEY W. BARNES
BY WILLIAM M. BROBECK
Robert A. Lavender
ATTORNEY

CALUTRON RECEIVER

Filed Aug. 1, 1946 7 Sheets-Sheet 2

INVENTOR.
SIDNEY W. BARNES
BY WILLIAM M. BROBECK

Robert A. Lavender

ATTORNEY

CALUTRON RECEIVER

INVENTOR.
SIDNEY W. BARNES
BY WILLIAM M. BROBECK
Robert A. Lavender
ATTORNEY

Dec. 13, 1955 S. W. BARNES ET AL 2,727,152

CALUTRON RECEIVER

Filed Aug. 1, 1946 7 Sheets-Sheet 4

INVENTOR.
SIDNEY W. BARNES
BY WILLIAM M. BROBECK
Robert A. Lavender
ATTORNEY

INVENTOR.
SIDNEY W. BARNES
BY WILLIAM M. BROBECK
Robert A. Lavender
ATTORNEY

CALUTRON RECEIVER

INVENTOR.
SIDNEY W. BARNES
WILLIAM M. BROBECK
BY Robert A. Lavender
ATTORNEY

Dec. 13, 1955 S. W. BARNES ET AL 2,727,152

CALUTRON RECEIVER

Filed Aug. 1, 1946 7 Sheets-Sheet 7

INVENTOR.
SIDNEY W. BARNES
BY WILLIAM M. BROBECK
Robert A. Lavender
ATTORNEY

United States Patent Office 2,727,152
Patented Dec. 13, 1955

2,727,152

CALUTRON RECEIVER

Sidney W. Barnes, Rochester, N. Y., and William M. Brobeck, Berkeley, Calif., assignors, by mesne assignments, to the United States of America as represented by the United States Atomic Energy Commission Application August 1, 1946, Serial No. 687,632

8 Claims. (Cl. 250—41.9)

The general subject of this invention involves the separation, based on difference in mass, of minute particles, such as atoms, and especially the separation of isotopes of an element, or the separation of a portion of an element enriched with respect to a particular isotope on a scale yielding commercially useful quantities of the collected material.

The type of means or mechanism to which the invention relates is known as a "calutron," and correspondingly the method or process is known as a "calutron" method or process. For a complete disclosure of a calutron and its mode of operation, reference is made to the copending application of Ernest O. Lawrence, Serial No. 557,784, filed October 9, 1944, for "Methods of and Apparatus for Separating Materials," now Patent No. 2,709,222.

The presently preferred form of the calutron comprises an evacuated tank disposed between the poles of an electromagnet so that the evacuated space within the tank is pervaded with a magnetic field of high flux density. Within the tank there is provided a "source unit" that includes means for supplying the polyisotope as a vapor or gas to an ionizing region, ionizing apparatus for producing positively ionized particles from the vapor, and an accelerating device maintained at a high negative electrical potential with respect to the ionizing apparatus for withdrawing the positive ions and imparting to each of them a predetermined energy in the form of substantially uniform velocities along paths generally normal to the direction of the magnetic field from a linear virtual focus toward an elongated beam defining slit in the accelerating device disposed generally parallel to the direction of the magnetic field.

After passing through the beam defining slit, the accelerated ions continue to move transversely to the magnetic field and are constrained to travel along substantially arcuate paths having radii that vary with the masses of the particles (within a magnetic field of uniform intensity). The paths for the ions of a given mass diverge to either side of a median path to an extent determined by the geometry of the ionizing and accelerating devices and by such inhomogeneity as may exist in the magnetic field through which the ions travel. This divergence of the paths of travel of the ions of a given mass continues through the first 90° of arcuate travel from the virtual focus at the source unit, and then the paths converge during the next 90° and cross each other in a region of focus approximately 180° from the virtual focus. Thus, in effect, geometrical focusing of a ribbon-shaped stream of ions of a given mass is accomplished adjacent the 180° point, even though there is a relatively wide initial angle of divergence of the ions. Likewise, the ions of any other given mass travel along paths that define a ribbon-shaped stream coming to a similar focus approximately 180° from the virtual focus at the source unit.

A receiver is disposed within the vacuum tank adjacent the 180° foci of the isotope ions to be separated, for de-ionizing them and for separately collecting material from one or all of them as may be desired.

The paths of a stream of ions of a given mass do not all cross precisely at a 180° line focus, and the cross sectional area of the stream of ions at the region of sharpest focus thereof would normally have an elongated rectangular configuration of substantial width, the width varying with the maximum angular divergence of the ions at the source. The quantity of material transmitted in the beam also varies with the maximum angular divergence at the source, and, with streams of ions of the heavier elements, a practical minimum divergence for collecting commercial quantities of material produces 180° foci of such width that they overlap considerably. Thus, in practice, the quantities of material collectable at the receiver from one ion stream contain some material from the adjacent ion stream and are merely enriched with respect to a particular isotope.

When employing a uniform magnetic field within the calutron tank, the separation of ions of different isotopes having the same initial angular divergence is dependent solely upon the mass difference of the ions, and they are spaced apart at their respective 180° foci by an amount approximately equal to the difference in the diameters of their respective paths. By reducing the divergence of the beam at the beam defining slit, the widths of the respective 180° foci of streams of ions of different isotopes may be reduced and the amount of overlap of these foci correspondingly reduced. However, since the amount of material transmitted in the beam is proportional to the angular divergence at the source, the amount of overlapping of the 180° foci of streams of ions of different isotopes increases (and the obtainable degree of enrichment of collected material with respect to a particular isotope decreases) as the amount of material transmitted in the beam is increased. As a result, a compromise has been required between maximum production and maximum enrichment.

In order to increase the quantity of material transmitted in an ion beam without reducing the isotopic enrichment of the collected material, the shape or configuration of the beam may be modified by means of specially contoured bodies of magnetically permeable material, known as "magnetic shims," that may be introduced into the calutron tank to cause predetermined variations in the magnetic field and a consequent relative shifting of the ion paths. In a copending application of Julius Robert Oppenheimer et al., Serial No. 637,690, filed December 28, 1945, certain arrangements of magnetic shims are disclosed for producing a modified, or "magnetically shimmed," beam in which the normally elongated, rectangular, 180° focal pattern of each isotope ion stream is compressed along one side, is extended along the opposite side, and, in addition, is curved to produce what may be termed a "gull-wing" pattern, whereby the average width of the pattern for each isotope ion stream is reduced and the length thereof is increased. In this manner, the overlapping of the ion streams of different isotopes is substantially reduced, or entirely eliminated for any given maximum, initial, angular divergence of the beam at the source, whereby the amount of material transmitted in the beam may be increased by employing a greater maximum initial angular divergence without correspondingly increasing the contamination of the material arriving at the 180° focus of one isotope ion stream with material from the adjacent stream of ions of a different isotope.

In another copending application of Ernest O. Lawrence, Serial No. 536,401, filed May 19, 1944, now Pat. No. 2,714,664, a number of forms of a calutron are disclosed in which a plurality of ion beams are transmitted through the evacuated space within a single tank in order to effect certain obvious economies. Several of these forms (Figs. 15, 16, and 30) involve a source unit for transmitting a plurality of ion beams in non-interfering, intersecting relation through the interior of the evacuated tank to respective, closely adjacent regions of focus, and a unitary, multiple beam receiver disposed in the paths of the plurality of beams at their regions of focus for collecting desired material therefrom.

The above-mentioned application of Oppenheimer et al. also discloses how magnetic shims may be adapted in plural beam calutrons, of the forms last discussed in connection with the Lawrence application, Serial No. 536,401, for modifying a plurality of intersecting beams in a substantially identical manner in order to achieve greater separation of the component isotope ion streams of each beam at its region of focus.

The present invention relates particularly to calutron receivers for plural beam calutrons in which a plurality of beams are projected toward respective, closely adjacent regions of focus; and the invention is illustrated herein by a receiver construction and arrangement specifically designed for receiving a plurality of such beams that have been modified by magnetic shims in accordance with the Oppenheimer et al. application. More specifically, the embodiment of the invention illustrated herein is one designed for receiving a plurality of non-interfering, intersecting, magnetically shimmed beams of singly ionized uranium ions for separately collecting a portion of each beam enriched with respect to the $U^{235}$ isotope and impoverished with respect to the $U^{238}$ isotope. Throughout the following description of the invention, the $U^{234}$ isotope will be ignored, as it comprises too small a proportion of normal uranium to be of any importance as a contaminant of the $U^{235}$ enriched product to be collected.

An object of the invention is to provide an improved arrangement of calutron receivers for a plural beam calutron.

Another object of the invention is to provide an improved structure for supporting a plurality of calutron receiver units adjacent the regions of focus of a corresponding plurality of ion beams to be respectively received thereby.

Another object of the invention is to provide structure for supporting a plurality of calutron receiver units in a manner permitting ready adjustment of the relative positions of the receivers with respect to each other and with respect to the beams to be received thereby, and, more particularly, in a manner permitting ready adjustment of the spacing between the receivers and independent adjustment of each receiver in a direction along the general path of travel adjacent its region of focus of the beam to be received thereby.

Still another object of the invention is to provide apparatus associated with a pair of closely adjacent receivers for reducing contamination of the material collected from one beam by an associated receiver with scattered material from an extraneous portion of that beam traveling in a direction such that it strikes an adjacent receiver.

Further objects and advantages of the invention will become apparent from the following detailed description thereof taken in connection with the accompanying drawings, in which.

Figure 2:
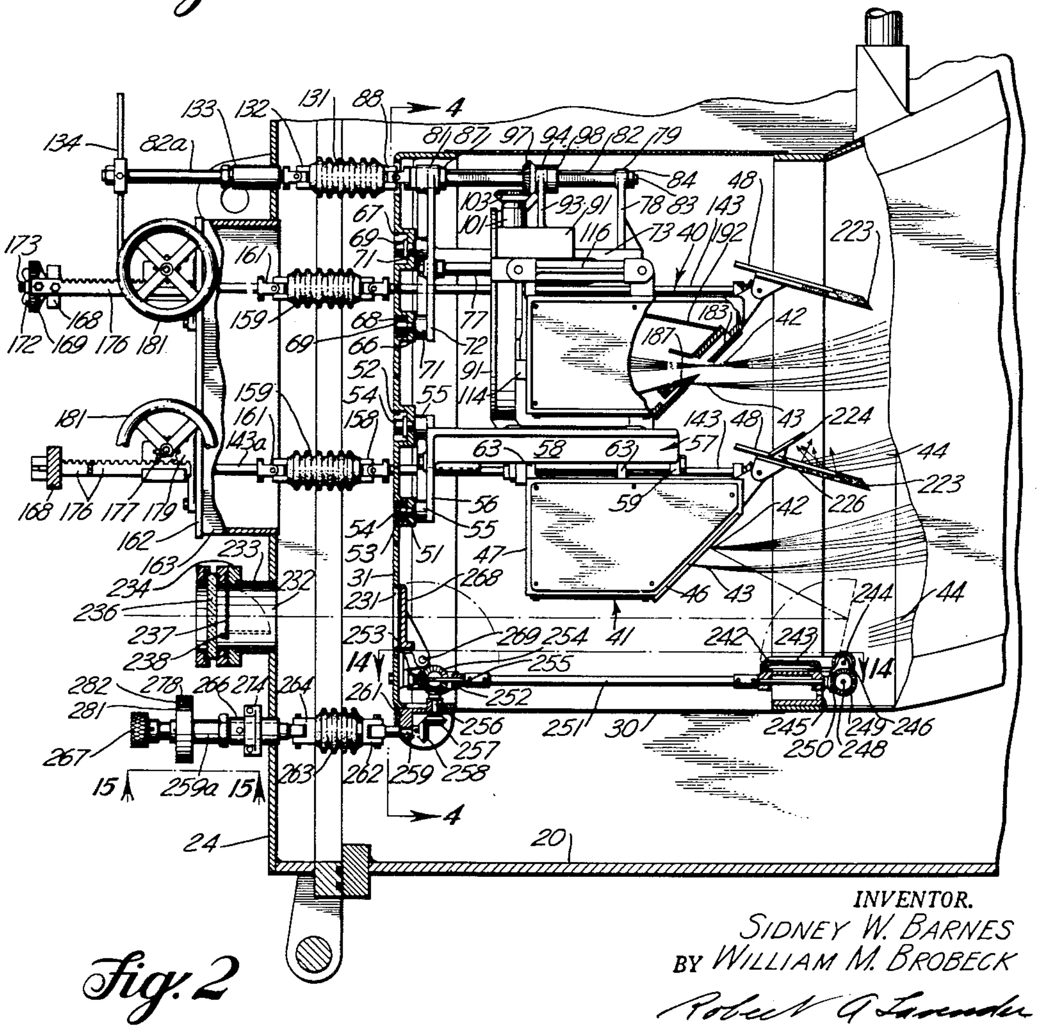
Fig. 2 is a side elevational view on an enlarged scale of the portion of the calutron tank surrounding the receivers, certain parts being broken away to show details of the mounting of the receivers in the tank.
Figures 12, 13, 14, 15:
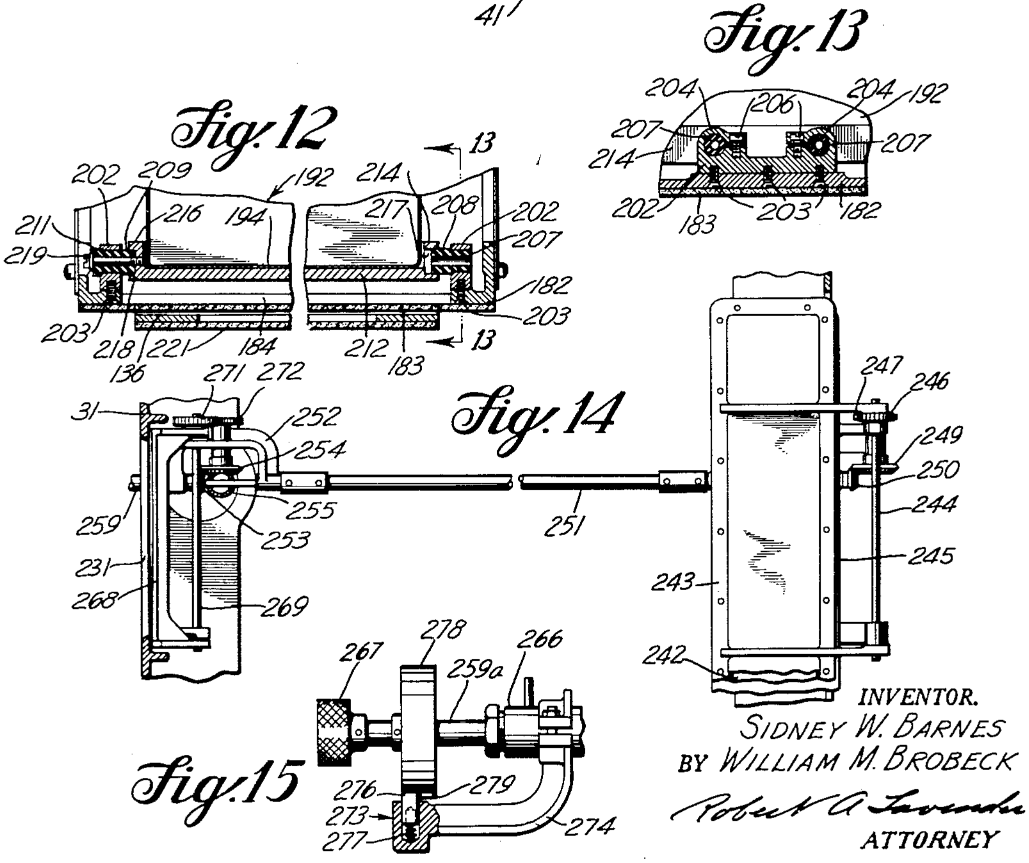
Fig. 12 is a fragmentary sectional view through the viewing face of one of the receivers, the plane of the section being indicated by the line 12—12 in Fig. 6.
Fig. 13 is a fragmentary sectional view of a portion of the structure shown in Fig. 12, the plane of the section being indicated by the line 13—13 in Fig. 12.

Fig. 14 is a fragmentary sectional view of mechanism shown in Fig. 2 for moving a viewing mirror by means of which certain phenomena occurring with the calutron tank may be observed from outside the tank, the plane of the section being indicated by the line 14—14 in Fig. 2; and Fig. 15 is a fragmentary sectional view of another part of the mirror moving mechanism partially shown in Figs. 2 and 14, the plane of the section being indicated by the line 15—15 in Fig. 2.

Figure 1:
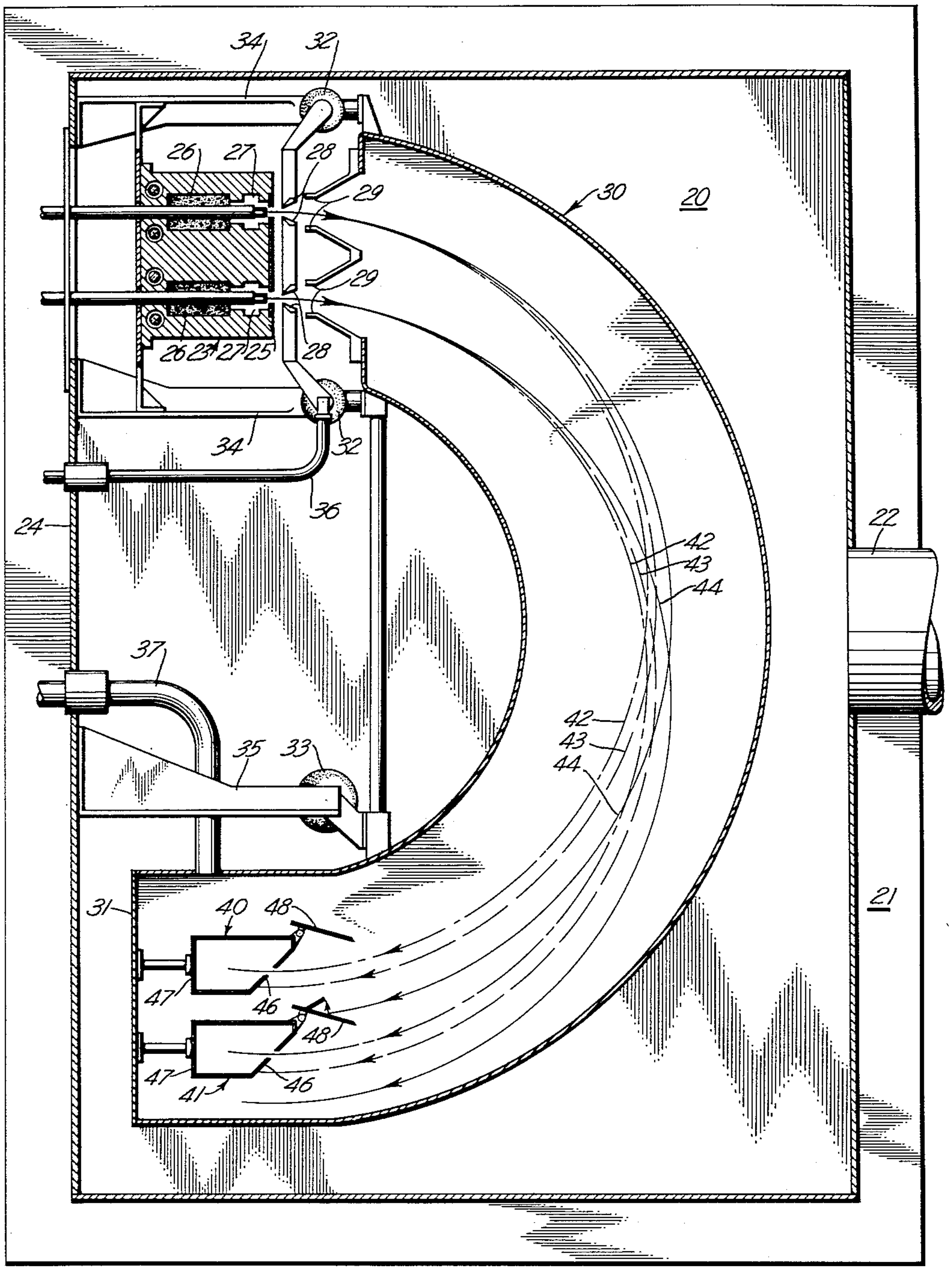
Figure 1 is a vertical sectional view of a calutron tank, showing the arrangement of a plural beam source unit and a corresponding plurality of receivers within the tank and the relation of the tank to the magnet, the structure being shown, for the most part, somewhat schematically for simplicity.

Referring first to Fig. 1, there is illustrated a calutron of the general character disclosed in the Lawrence application, Serial No. 557,784, mentioned above, but modified in accordance with the general principles disclosed in the second Lawrence application mentioned above, Serial No. 536,401, for transmitting a pair of intersecting, non-interfering ion beams from a source unit to a pair of receiver units, the beams being magnetically shimmed in a manner (not shown) disclosed in the above-mentioned Oppenheimer et al application and described briefly in the foregoing discussion. The calutron comprises a tank 20 that is rectangular in elevation, as shown in Fig. 1, and is supported midway between a pair of vertically disposed, horizontally spaced-apart, pole faces 21 (only one being shown) of a calutron magnet, whereby a magnetic field may be created throughout the interior of the tank with the magnetic lines of force passing generally horizontally therethrough. The tank is adapted to be evacuated through a pump-out conduit 22 to reduce the interior pressure in a manner disclosed in the above-mentioned Lawrence application, Serial No. 557,784.

A source unit, illustrated schematically in Fig. 1 and generally designated 23, is mounted within the tank 20 adjacent the upper edge of a removable wall or face plate 24 thereof. The source unit 23 is adapted to produce, from a polyisotopic charge material such as $UCl_4$, two intersecting, non-interfering beams of singly ionized positive ions traveling along substantially arcuate paths from the source unit toward respective regions of focus approximately 180° along said paths adjacent the bottom edge of the tank face plate 24. As hereinbefore indicated, the source unit 23 is designed to project the ions of any given mass traveling with a particular beam, along paths that are initially divergent to either side of a median path for that beam by various angles between predetermined maxima and that later converge toward and diverge beyond the 180° region of focus for that beam at angles to either side of a median path dependent upon their respective initial angular divergences and upon the effects of the modified magnetic field through which the ions travel. In order to produce two such beams, the source unit 23 is provided with a source block 25 containing two charge material reservoirs 26 in which charge material is vaporized, and two ionizing chambers 27 respectively adapted to receive vaporized charge material from the reservoirs 26 and to ionize the vapor by means of an arc discharge. Respective pairs of spaced-apart, ion accelerating electrodes 28 are disposed in front of the ionizing chambers 27 and are all maintained at a common, highly negative, electrical potential with respect to the source block 25 for withdrawing two separate streams of positive ions therefrom and imparting to the ions substantially uniform kinetic energies in the form of velocities directed between the associated pair of electrodes 28. Respective pairs of spaced-apart ion decelerating electrodes 29 are disposed ahead of the pairs of accelerating electrodes 28 and are all maintained at a common negative potential with respect to the source block 25, but at a potential less negative than the potential of the accelerating electrodes 28 for partially decelerating the ions accelerated by the electrodes 28 as they travel toward the gaps between the electrodes 29. For a more detailed description of the purpose and mode of operation of the electrodes 28 and 29, reference is made to the copending application of Byron T. Wright, Serial No. 605,959, filed July 19, 1945.

The ions of the two beams created by the source unit 23, in the manner described above, travel through a liner 30 that surrounds the beams on all sides and has an open end attached to the outermost ones of the two pairs of decelerating electrodes 29 and an opposite end closed by a wall 31. The liner 30 is maintained at the same electrical potential as the decelerating electrodes 29, so that ions passing through the liner travel in a substantially uniform electric field, and the liner is suitably supported and insulated from the removable wall 24 of the tank by any suitable arrangement of insulators 32 and 33 and supporting brackets 34 and 35, indicated schematically in Fig. 1. An insulating conduit 36 is provided through which the electrical leads from the accelerating electrodes 28 may be passed to the outside of the tank, and another insulating conduit 37 is provided through which electrical leads from the receivers at the opposite end of the liner 30 may be passed to the outside of the tank. These conduits are constructed with suitable vacuum seals (not shown) for preventing leakage of air therethrough into the tank.

Two ion receivers, generally designated 40 and 41, are disposed within the liner 30 adjacent the end wall 31 thereof for respectively receiving ions traveling in the two beams projected from the source unit 23 through the liner 30. Each of these beams is schematically illustrated in Fig. 1 by two lines 42 and 43 that respectively represent median paths of the singly charged, positive, $U^{235}$ and $U^{238}$ components of a beam produced from $UCl_4$ charge material, and by a third line 44 representing a median path of a side band of $U^{238}Cl^+$ ions. The two receivers are identical in most respects and are adapted to be positioned with their beam viewing faces 46 disposed in the paths of the $U^+$ portions of the beams to be respectively received thereby. Structure defining the beam viewing face 46 of each receiver (described in more detail hereinafter) is mounted on a suitable receiver frame 47 that is formed, in the present instance, as a casting of nonmagnetic stainless steel; and a swinging type door 48 is mounted on each receiver for movement between an open position out of the paths of the $U^+$ components of the beams and a closed position in the path of the $U^{235}$ component of the beam to be received by the receiver on which the door is mounted.

The receiver 41 is mounted on structure described hereinafter in such a manner that this receiver may be moved horizontally along a path parallel to the general direction of travel of the beam to be received thereby at its 180° region of focus, whereby the viewing face of this receiver may be positioned to intercept that beam at the sharpest foci of the $U^{235}$ and $U^{238}$ components thereof. The vertical positions of the sharpest foci of both of the beams are adjusted with respect to this receiver by appropriate adjustment of the ion accelerating and decelerating potentials at the electrodes 28 and 29 of the source unit 23. After the accelerating and decelerating potentials for both beams are properly set with respect to the vertical position of the receiver 41, it may be necessary to adjust the vertical position of the receiver 40, as well as its horizontal position along the path of the beam to be intercepted thereby, in order to locate the viewing face of this receiver precisely at the sharpest foci of the $U^{235}$ and $U^{238}$ components of that beam. Thus, the receiver 40 is mounted on structure described hereinafter (not indicated in Fig. 1), in such a manner that it may be moved both vertically and horizontally for this purpose.

The supporting structure for the receiver 41 will first be described with particular reference to Figs. 2, 4, 6, 7, and 10. The liner end wall 31 is provided with three integrally formed, inwardly projecting bosses 51 that are respectively pierced by two, elongated, countersunk apertures 52 and a circular, countersunk aperture 53 to accommodate three hexagonal hollow-head screws 54, respectively. The screws 54 are respectively tapped into three bosses 55 formed on a base portion 56 of a receiver supporting bracket 57. The bracket 57 includes two laterally spaced-apart arms 58 that project forwardly from opposite sides of the base portion 56 and that have two apertured ears 59 respectively formed on their forward ends. Two receiver supporting rods 61 are respectively mounted at their rearward ends in opposite sides of the base portion 56 of the bracket 57 and at their forward ends in the apertured ears 59 of the bracket 57. These rods are formed with portions 62 of slightly enlarged diameter adjacent their rearward ends to form limiting stops for limiting the rearward movement of the associated receiver 41.

The frame 47 of the receiver 41 is provided with two pairs of integrally formed, apertured ears 63, one pair being disposed on one side of the upper surface of the receiver with one of the rods 61 passing therethrough and the other pair being disposed on the opposite side of the upper surface of the receiver with the other rod 61 passing therethrough. Thus, the receiver is supported by the rods 61 for horizontal, sliding movement therealong, its forward movement being limited by the ears 59 on the bracket 57 and its rearward movement being limited by the enlarged portions 62 of the rods 61.

Movement of both of the receivers 40 and 41 along their respective horizontal paths of travel is controlled by separate, but identical, mechanisms. For convenience, therefore, these mechanisms will be described together hereinafter, after first describing how the receiver 40 is mounted for both vertical and horizontal movement.

The supporting structure for the receiver 40 will now be described with particular reference to Figs. 2, 4, 6, 7, and 9. The liner end wall 31 is provided with three, integrally formed, inwardly projecting bosses 66 that are respectively pierced by two elongated, countersunk apertures 67 and a circular, countersunk aperture 68 to accommodate three hexagonal, hollow-headed screws 69, respectively. The screws 69 are respectively tapped into three bosses 71 formed on a base portion 72 of a bracket 73. The bracket 73 includes two laterally spaced-apart arms 74 that project forwardly from opposite sides of the base portion 72 and that have two apertured ears 76 respectively formed on their forward ends. Two horizontally disposed rods 77 are respectively mounted at their rearward ends in opposite sides of the base portion 72 of the bracket 73 and at their forward ends in the apertured ears 76 of the bracket, the rods 77 being of uniform diameter for the full distance between the ears 76 and the base portion 72 of the supporting bracket 73.

An upwardly projecting web 78 is formed integrally with the arms 74 of the bracket 73, adjacent and connecting the forward ends of the arms, and is provided with a bearing boss 79 formed thereon; and the base portion 72 of the bracket 73 extends upwardly and terminates in an integrally formed bearing boss 81. The two bearing bosses 79 and 81 are aligned for journaling a shaft 82 adjacent opposite ends thereof, the shaft 82 being of hexagonal cross section between the bosses 79 and 81. At the boss 79, the shaft 82 is provided with a reduced journal portion 83 that projects forwardly beyond the boss 79 to accommodate a shaft-retaining element 84 held on the portion 83 by a pin 86. At the boss 81, the shaft 82 is provided with an enlarged journal portion 87 that projects rearwardly beyond the boss and terminates in a universal joint 88.

A hollow frame 91, generally rectangular as viewed in elevation, is supported by the two rods 77 for sliding movement therealong by means of two relatively long, apertured bosses 92 integrally formed on the frame, the rods 77 being respectively passed through the apertures in the bosses 92 with a free sliding fit. An integral, upwardly extending, irregular projection 93 is formed on the frame 91 and includes an apertured ear 94 adapted to journal a sleeve 96 having a beveled gear 97 integrally formed on one end thereof. The sleeve 96 and the gear 97 are provided with a hexagonal aperture therethrough for accommodating the hexagonal portion of the shaft 82 in a free sliding fit, whereby the sleeve 96 and its associated gear 97 may slide along the shaft 82 and will be constrained to rotate therewith. The sleeve 96 is held in the ear 94 by means of the beveled gear 97 on one end thereof and a collar 98 secured on the opposite end thereof by a set screw 99. The projection 93 also includes an enlarged, apertured boss 101 serving as a bearing for a vertically disposed, rotatable shaft 102 that projects upwardly through the boss 101 and terminates in a beveled pinion 103 rigidly mounted thereon in mesh with the beveled gear 97, whereby rotation of the beveled gear 97 will cause rotation of the vertically disposed shaft 102. The shaft 102 is secured in the boss 101 against axial movement by the pinion 103 at one end of the boss and a collar 104 at the other end of the boss, the collar 104 being secured to the shaft by means of a set screw 106. The shaft 102 is provided below the boss 101 with an enlarged, threaded portion 107 that is screwed into an internally threaded, tubular member 108, whereby rotation of the shaft 102 will cause relative axial travel of the tubular member 108 with respect thereto. At its lower end the tubular member 108 is provided with a pair of spaced-apart, apertured ears 109, and a link 111 is pivotally secured at one end therebetween by means of a pin 112. At its opposite end, the link 111 is pivotally secured, by means of a pin 113, between a pair of apertured ears 114 that project rearwardly from and are integrally formed on the frame 47 of the receiver 40.

Figure 6:
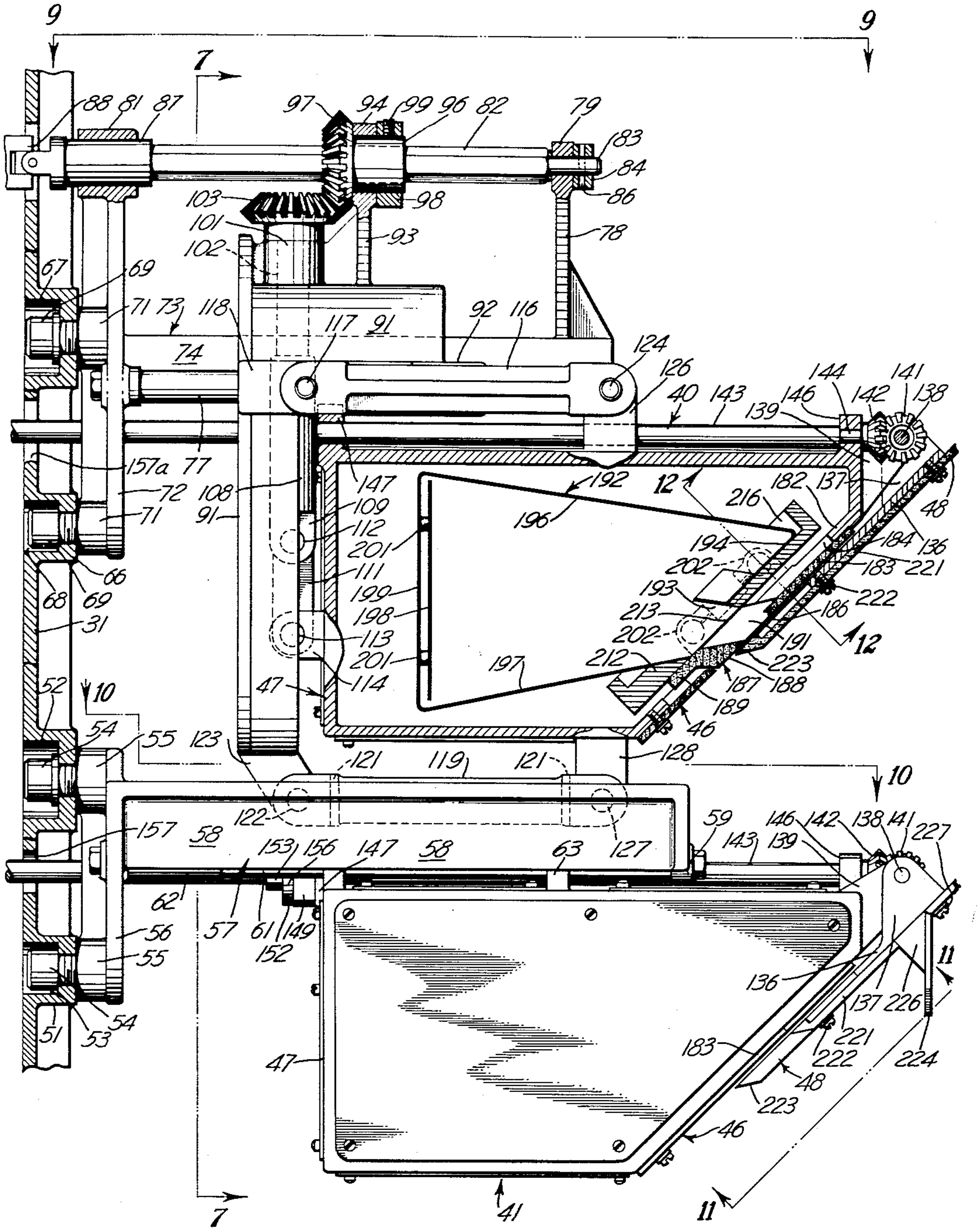
Fig. 6 is an elevational view on an enlarged scale of the receivers shown in Fig. 2 and of a portion of the structure by means of which the receivers are supported and their positions adjusted, the view being partly in section taken along a plane indicated by the line 6—6 in Fig. 9 and partly broken away for clarity.
Figure 7:
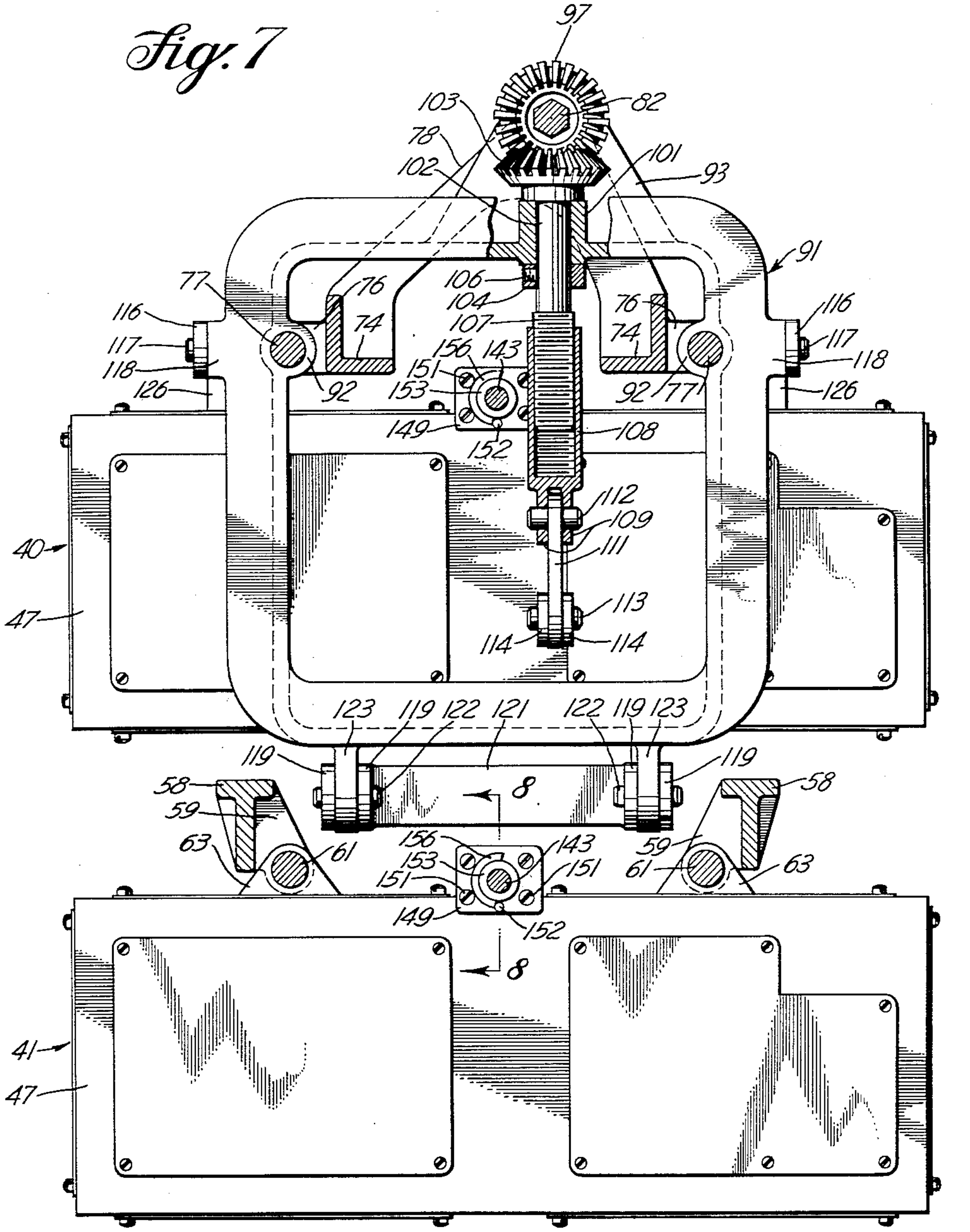
Fig. 7 is a sectional view taken along a plane indicated by the line 7—7 in Fig. 6, certain parts being broken away for clarity.
Figure 8:
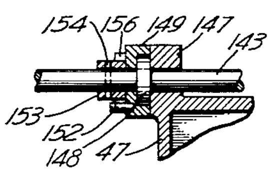
Fig. 8 is a fragmentary sectional view of a portion of one of the receivers, the plane of the section being indicated by the line 8—8 in Fig. 7.
Figure 9:
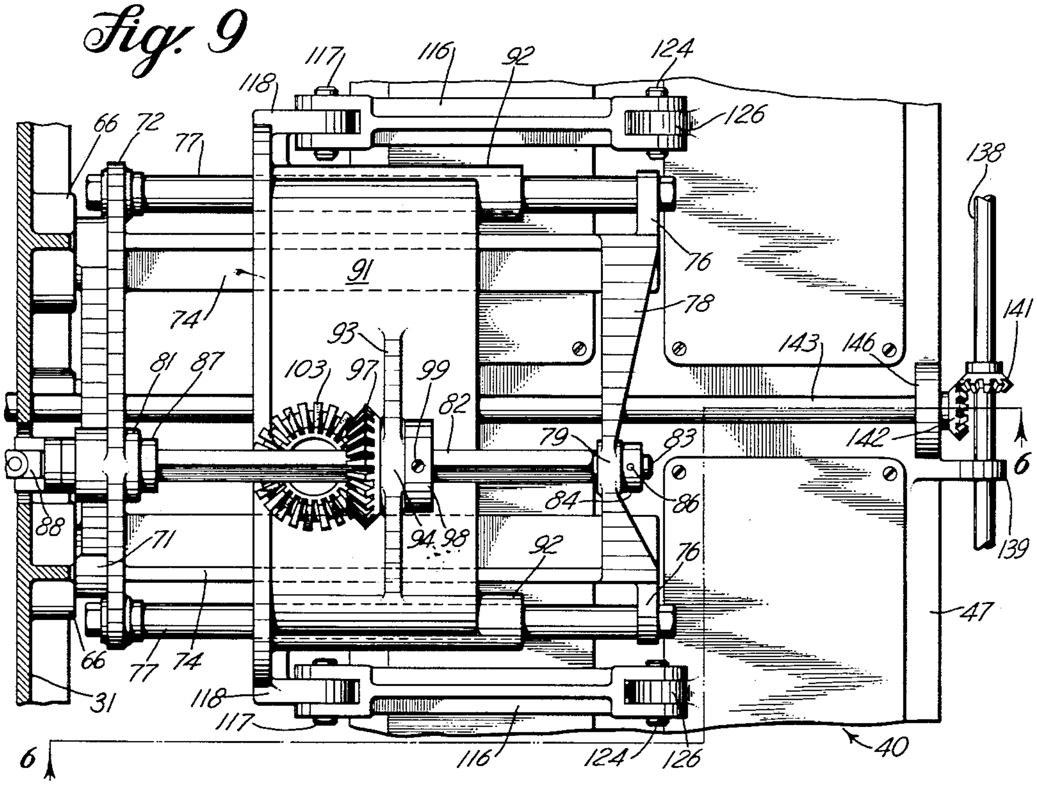
Fig. 9 is a plan view of a portion of the structure shown in Fig. 6, looking at the structure as indicated by the line 9—9 in Fig. 6.
Figure 10:
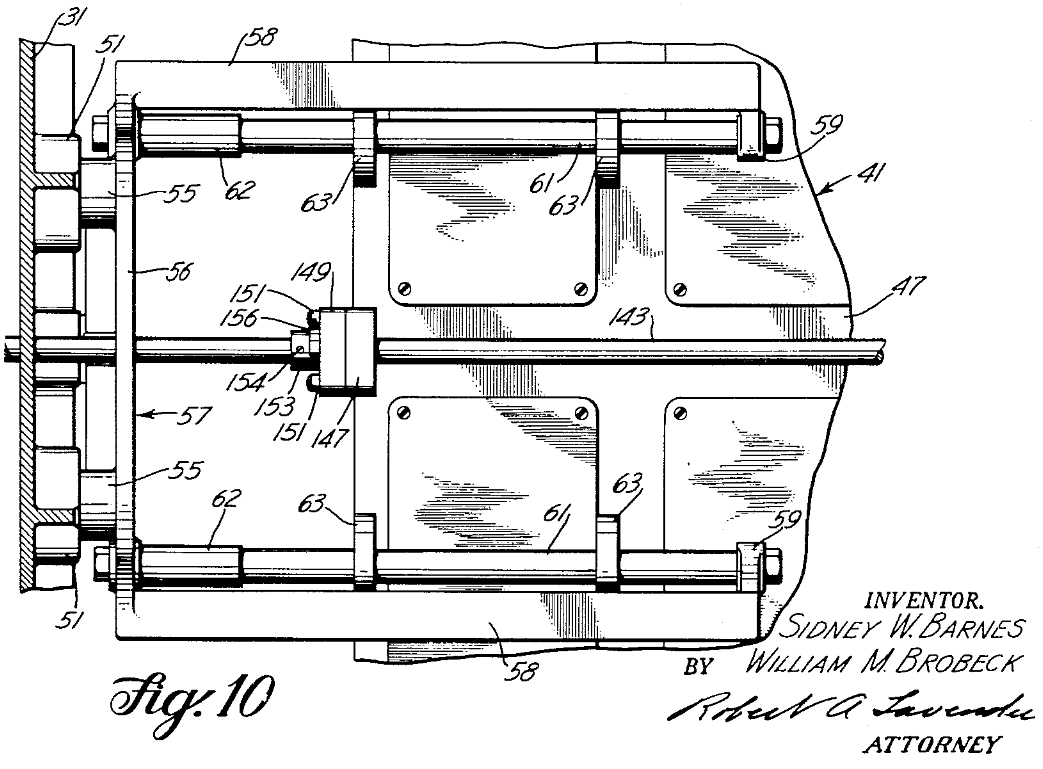
Fig. 10 is a plan view of another portion of the structure shown in Fig. 6, looking at the structure as indicated by the line 10—10 in Fig. 6.
Figure 11:
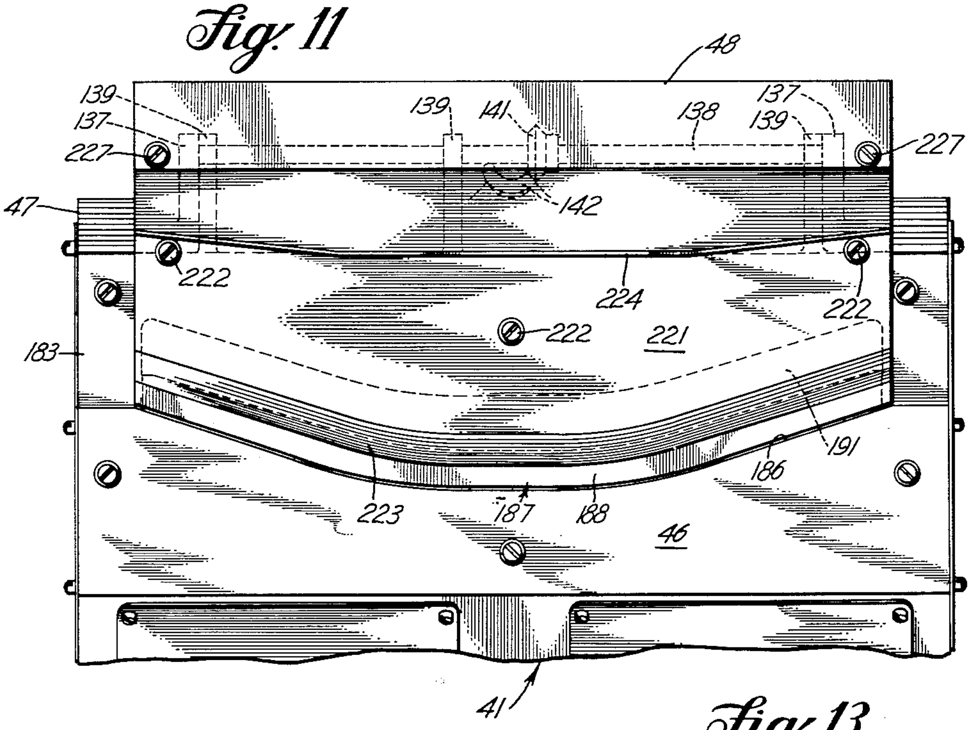
Fig. 11 is a view of one of the receivers, looking at the beam viewing face thereof as indicated by the line 11—11 in Fig. 6, with a door for shielding a portion of the viewing face shown in its operative closed position.

As is most readily apparent from Fig. 6, rotation of the hexagonal shaft 82 causes rotation of the vertically disposed shaft 102 and axial travel of the tubular member 108, which in turn causes a corresponding travel of the rearward end of the receiver 40 toward or away from the receiver 41. The receiver 40 is supported by the movable frame 91 by means of a parallel motion linkage whereby the described travel of the rearward end of this receiver causes the entire receiver to partake of the same movement. This parallel motion linkage comprises two spaced-apart, generally horizontally extending arms 116 that are independently pivotally mounted at their rearward ends on opposite sides of the movable frame 91 by means of respectively associated pins 117 and ears 118 integrally formed on the movable frame, and two similar arms 119 that are connected together by two crossbraces 121 to form a rigid frame and that are pivotally mounted at their rearward ends, by pins 122, on downwardly extending ears 123 integrally formed on the movable frame 91. At their forward ends, the arms 116 are respectively pivotally connected, by pins 124, to upwardly projecting ears 126 formed integrally on the frame 47 of the receiver 40, and the arms 119 are similarly connected, by pins 127, to downwardly projecting ears 128 integrally formed on the frame 47 of the receiver 40.

Rotation of the hexagonal shaft 82, for moving the receiver 40 toward or away from the receiver 41, is manually accomplished from outside the calutron tank 20. For this purpose, the universal joint 88 on the rearward end of the shaft 82 is connected to one end of a ceramic insulator 131, that is connected at its opposite end to another universal joint 132 on one end of an extension 82*a* of the shaft 82. The shaft 82 projects out of the tank 20, through a conventional Wilson seal 133 mounted on the removable tank face plate 24, and terminates in a spoked hub 134 by means of which the shaft may be rotated. The ceramic insulator 131 (as well as similar parts hereinafter described) performs the obvious function of preventing grounding of the liner 30 to the tank 20 as well as preventing the building up of a potential on the manual control that would injure an operator touching it. The two universal joints 88 and 132 make it unnecessary to maintain the shaft 82 and its extension 82*a* in alignment and permit adjustment of the position of the liner 30 without disturbing the apparatus by which the vertical position of the receiver is adjusted.

As noted above, the movable frame 91 is mounted on the two horizontally disposed rods 77 for sliding movement therealong, such movement being permitted by the fact that the beveled gear 97 and its associated sleeve 94 are slidable along the hexagonal shaft 82. Since the receiver 40 is supported on the movable frame 91 by the arms 116 and 119 of the parallel linkage described above, the receiver 40 may be moved along a horizontal path of travel that is limited by the distance the long bosses 92 of the movable frame 91 may slide along the associated rods 77. Also, as noted above, the manner in which the receiver 41 is supported permits it to be moved along a similar horizontal path of travel that is limited by the distance the ears 63 of the frame 47 of this receiver may slide along the associated receiver supporting rods 61. Independent movement of the receivers 40 and 41 along their respective horizontal paths of travel is manually accomplished from outside the calutron tank 20 by individual manipulation of substantially identical mechanisms, which mechanisms are also respectively connected to the doors 48 of the two receivers and are independently operative to open and close the doors. To avoid unnecessary repetition, therefore, only the mechanism associated with the receiver 41 for these purposes will be described, and it is to be understood that this description is equally applicable to the similar mechanism associated with the receiver 40, though, for convenience, all the details of the mechanism for the receiver 40 have not been shown in the drawings.

Referring particularly to Figs. 3 to 8, 10 and 11, movement of the receiver 41 along its horizontal path of travel and opening and closing of the door 48 thereon is controlled from outside the calutron tank by appropriate manipulation of a single control shaft that is mounted for axial movement to effect horizontal travel of the receiver and for rotary movement to actuate the door. Considering this mechanism in detail, the door 48 of the receiver 41 includes a backing plate 136 having two ears 137 integrally formed thereon at opposite ends thereof, and a shaft 138 is mounted at its opposite ends in the ears 137 and is keyed thereto so that appropriate rotation of the shaft will swing the door about the axis of the shaft between open and closed positions. The shaft 138 is rotatably mounted adjacent the forward end of the frame 47 of the receiver 41 in three ears 139 formed integrally with the receiver frame, and a beveled pinion 141 is mounted on and keyed to this shaft adjacent the center thereof. A beveled gear 142 is mounted on the forward end of a horizontally disposed, rotatable shaft 143, the beveled gear being in mesh with the beveled pinion 141 whereby rotary movement of the shaft 143 will be transmitted to the shaft 138 and cause the door to swing about its axis of rotation.

To assist in preventing axial movement of the shaft 143 with respect to the receiver 41, the forward end of the shaft is formed with a portion 144 of reduced diameter that projects through another ear 146 integrally formed on the receiver frame, and the beveled gear 142 is keyed on this reduced portion 144 beyond the ear 146, whereby axial movement of the shaft 143 in either direction with respect to the receiver frame is prevented. Alignment of the shaft 143 with respect to the receiver 41 is maintained by means of another ear 147 integrally formed on the receiver frame 47 adjacent the rearward end of the upper surface thereof, and suitable structure carried by this ear 147 cooperates with a collar 148 on the shaft 143 to provide additional restraint against axial movement of the shaft and to limit the rotation thereof between angular positions corresponding to the open and closed door positions. This structure mounted on the ear 147 includes an apertured cap 149 that fits around the shaft 143 and bears against the collar 148 thereon, the cap 149 being secured to the ear 147 by suitable fastening elements 151 and being provided with a pin 152 rigidly mounted therein on the rearward surface thereof. An additional collar 153 is secured on the shaft 143 adjacent the cap 149 by means of a pin 154, and the collar 153 is provided with an integral, semi-annular flange 156, the opposite ends of which are respectively adapted to contact the pin 152 when the shaft 143 reaches the limits of its rotary movement, in this instance approximately 180° apart. The beveled gear 142 and the beveled pinion 141 are designed to maintain a ratio between the angular rotation of the shafts 143 and 138, such that rotation of the shaft 143 through 180° will swing the door 48 through the angle between its open position (shown in Fig. 2) and its closed position (shown in Fig. 6).

From the receiver 41, the shaft 143 extends further rearwardly through an aperture 157 (Fig. 4) in the end wall 31 of the liner 30 to a universal joint 158 connecting the shaft 143 to one end of a ceramic insulator 159, the ceramic insulator being connected at its opposite end by means of another universal joint 161 to an extension 143*a* of the shaft 143. The extension 143*a* continues further rearwardly from the ceramic insulator 159 and extends through an end plate 162 of a well structure 163 formed on the removable face plate 24. A conventional Wilson seal 164 (Fig. 5) is mounted on the end plate 162 of the well structure 163, and the extension 143*a* of the shaft 143 passes out of the well structure through the Wilson seal. At its outer or rearward end, the extension 143*a* of the shaft 143 is formed with an unthreaded shaft-portion 166 of reduced diameter and a hollow, internally and externally threaded shaft-portion 167 of still further reduced diameter.

Figure 5:
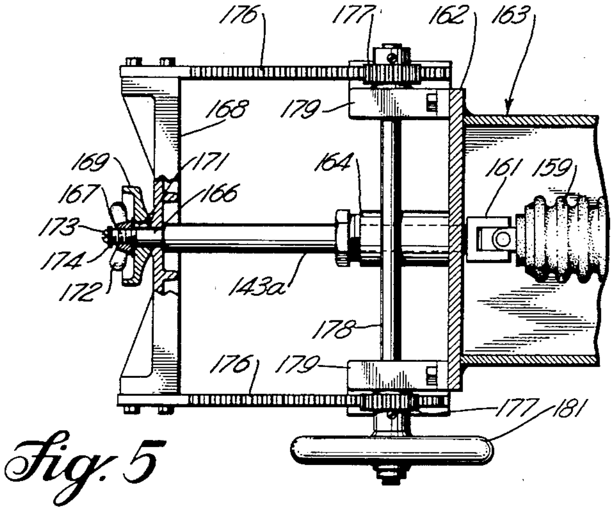
Fig. 5 is a horizontal sectional view taken along a plane indicated by the line 5—5 in Fig. 3.
Figures 3, 4:
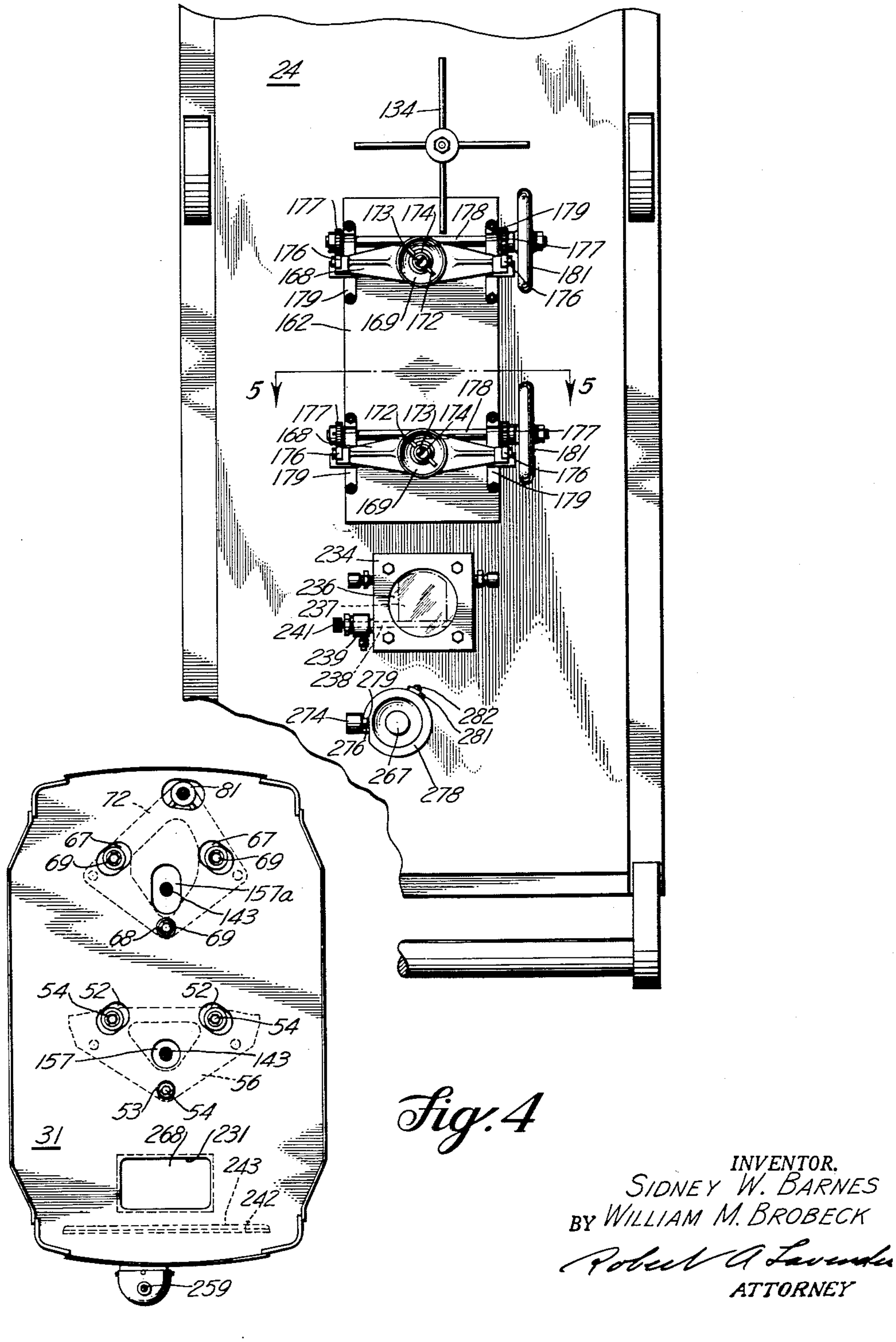
Fig. 3 is a fragmentary elevational view of a portion of one edge of the tank adjacent which the receivers are mounted.
Fig. 4 is a vertical sectional view taken along a plane indicated by the line 4—4 in Fig. 2.

Apparatus for manually controlling both the axial and rotary movement of the shaft 143 is mounted on the end plate 162 of the well structure 163 (Figs. 3 and 5). This apparatus includes a cross head 168 that is suitably apertured to permit only the shaft-portions 166 and 167 of reduced diameter to pass therethrough. A hand control knob 169 is mounted on the unthreaded shaft-portion 166, which projects beyond the cross head 168 a distance slightly less than the axial dimension of the hub of the control knob. The control knob is mounted on the unthreaded shaft-portion 166 for limited sliding movement with respect thereto while being constrained to rotate therewith by means of loosely fitting key 171. A wing nut 172 is screwed onto the threaded shaft-portion 167 and is adapted to be tightened against the hub of the control knob 169 for locking the extension 143*a* of the shaft 143 against longitudinal or rotary movement with respect to the cross head 168, and a screw 173, carrying a washer 174, is screwed into the internally threaded shaft-portion 167 for preventing accidental removal of the wing nut 172. Rotation of the control knob 169 for opening or closing the door 48 of the receiver 41 may be effected after slightly loosening the wing nut 172 to remove the frictional resistance to such rotation.

In order to effect axial movement of the shaft 143, two racks 176 are suitably secured to opposite ends of the cross head 168 and project toward the removable tank face plate 24, parallel to the shaft 143. The cross head 168 is of such a length that the racks 176 mounted thereon straddle the well structure 163 when they are moved toward the tank face plate 24 from the positions in which they are shown in Fig. 5. Two gears 177, respectively in mesh with the racks 176, are mounted on a cross shaft 178 that is journaled in spaced-apart bearing brackets 179 suitably mounted on the end plate 162 of the well structure 163, and a hand wheel 181 is mounted on one end of the cross shaft 178 for manually rotating it. Thus, by appropriate rotation of the hand wheel 181, the gears 177 are caused to drive the racks 176 toward or away from the tank face plate 24, and the motion of the racks 176 is imparted to the cross head 168 and to the shaft 143 for moving the receiver 41 along its horizontal path of travel.

As noted above, the other receiver 40 is associated with a substantially identical mechanism to that just described for swinging its door 48 between open and closed positions and for slidably moving the receiver and its supporting movable frame 91 along a horizontal path parallel to the path of travel of the receiver 41. Where the shaft 143 of this mechanism passes through the liner end wall 31, however, an elongated aperture 157*a* is provided, instead of a circular aperture such as 157, to accommodate vertical movement of the receiver 40.

Now, considering the structures forming the beam viewing faces 46 of the two receivers, including ion trapping means associated therewith, it will be necessary to describe only one of these structures, inasmuch as they are substantially identical. The following description of details of one of these structures will, therefore, be understood to apply equally well to the other. These details are shown in Figs. 6 and 11 to 13, inclusive, some of the details being shown on the receiver 40 and others being shown on the receiver 41. As explained in a copending application of Sidney W. Barnes, Serial No. 640,103, filed January 23, 1946, the magnetic shimming of a calutron ion beam causes a relative shifting of the 180° foci of maximum sharpness of the various beam components along the general direction of travel of the beam adjacent these foci. Therefore, in accordance with the principles disclosed in this last-mentioned application, the viewing face 46 of the receiver is so inclined with respect to the path of the beam that the plane of a beam delimiting aperture for passing one component of the beam and the ion intercepting surface of an electrode for intercepting another component of the beam respectively pass through the sharpest foci of the two beam components. As shown in the drawings, a forward wall 182 of the receiver frame 47 is inclined at an angle of about 45° to the general direction of travel of the beam adjacent its 180° foci in order to orient properly a face plate 183 mounted thereon. This wall 182 of the receiver frame is provided with a large rectangular opening 184 leading to the interior of the receiver, the opening being somewhat greater in length (its horizontal dimension) than the corresponding dimension of the 180° foci of the $U^{235}$ and $U^{238}$ components of the beam and somewhat greater in width than the combined width of these foci in a direction parallel to the wall 182.

The face plate 183 is preferably made of graphite and is secured directly to the wall 182 of the receiver frame in any suitable manner so that the beam viewing face 46 thereof is parallel to the wall 182 and passes through the 180° foci of maximum sharpness of the $U^{235}$ and $U^{238}$ components of the beam. The face plate 183 is provided with an elongated, curved slot 186 (Fig. 11) that is disposed in front of the opening 184 in the wall 182 of the receiver frame and that conforms generally to the cross sectional configuration of the beam at the region of focus, but that is somewhat reduced in size in order that the face plate will intercept all but a selected portion of maximum ion intensity of the $U^{235}$ and $U^{238}$ components of the beam.

A graphite electrode 187, including an ion intercepting surface 188 and a supporting extension 189, is mounted, in a manner described hereinafter, with the ion intercepting surface 188 disposed in the plane of the viewing face 46 and with the supporting extension 189 projecting behind the face plate 183. The ion intercepting surface 188 of the electrode 187 extends nearly the full length of the slot 186, terminating just short of the opposite ends thereof, and one side edge of the ion intercepting surface of the electrode extends longitudinally of the slot 186 substantially midway between its side edges for the full length of the electrode, while the opposite side edge of the electrode is similarly curvd and spaced a small distance from the adjacent edge of the slot 186 for substantially the full length of the electrode. With this arrangement, the electrode 187 is adapted to intercept a selected portion of the $U^{238}$ component of the beam and to define one side of a $U^{235}$ slot 191, within the larger slot 186, through which a selected portion of the $U^{235}$ component of the beam may pass, the selected portions of the two components of the beam preferably being substantially identical in cross sectional area and configuration.

An ion receiving pocket 192, having an elongated, curved opening 193 in the forward wall 194 thereof, is disposed within the receiver with the opening 193 aligned with the $U^{235}$ slot 191 so that substantially all ions passing through this slot will enter the pocket. Opposite upper and lower walls 196 and 197 of the pocket 192 diverge from the forward wall 194 thereof sufficiently to avoid direct bombardment by ions entering the pocket, and an ion receiving plate 198 is mounted on a back wall 199 of the pocket on stand-off insulators 201 for intercepting substantially all of the ions entering the pocket. With this arrangement, the rate at which ions enter the pocket 192 may be determined by reading the current flowing to the plate 198 through a suitable electrical lead (not shown) that may extend from the plate 198 out of the receiver, through the insulating conduit 37 (Fig. 1), and through a suitable meter (not shown) to liner potential.

The pocket 192 is mounted within the receiver frame 47 in insulated relation thereto by structure shown in detail in Figs. 12 and 13. This structure includes two brackets 202 secured to the back side of the forward wall 182 of the receiver frame, adjacent opposite ends thereof, by fastening elements 203. Each of these brackets is provided with two integrally formed split collars 204 that are adapted to receive tubular ceramic insulators, each collar being provided with a bolt 206 adapted to tighten the collar around the associated tubular insulator. The tubular insulators associated with the bracket 202 on one side of the receiver frame comprise portions 207 of one diameter adapted to fit into the associated split collars 204 and portions 208 of a larger diameter for limiting the distance the insulators may be inserted into their associated collars. The tubular insulators associated with the other bracket 202 on the opposite side of the receiver frame 47 are provided with relatively longer portions 209 of a small diameter adapted to fit into the associated split collars 204 and relatively shorter portions 211 of a larger diameter for limiting the distance these insulators may be inserted into their associated collars. A metal plate 212 is secured in any suitable manner to the forward wall 194 of the pocket 192 and is provided with an aperture 213 therethrough similar in size and configuration to the pocket opening 193 and aligned therewith. The plate 212 is provided with end flanges 214 and 216, and the enlarged portions 208 of the tubular insulators at one end of the pocket 192 are adapted to project into complementary apertures 217 extending through the adjacent flange 214 of the plate 212, and the portions 209 of small diameter of the tubular insulators at the other end of the pocket are adapted to project into complementary recesses 218 in the adjacent flange 216 of the plate 212. Two cap screws 219 pass through the portions 211 and 209 of the last-mentioned tubular insulators, respectively, and are tapped into the adjacent flange 216 of the plate 212, whereby the pocket 192 is securely supported in the position shown in the drawings while being maintained out of electrical contact with the receiver frame.

The electrode 187 may be mounted adjacent the lower forward edge of the pocket 192 on the plate 212 (Fig. 6) by any suitable fastening elements (not shown) connecting the extension 189 of the electrode to the plate 212. Since ions entering the pocket 192 are substantially all intercepted by the ion receiving plate 198 mounted therein, an electrical lead (not shown) from the electrode 187, or from any part of the pocket structure, through a suitable meter to liner potential will carry a current representing, with reasonable accuracy, the rate at which ions are intercepted by the electrode.

The purpose of the doors 48 of the receivers is to open and close the pocket 192 to the reception of ions during initial adjustment and focusing of the ion beam and at any time during a run when beam conditions become unsatisfactory for further reception and readjustment of the beam is necessary. Since the doors are subjected to intense ion bombardment when in their closed positions, they are provided with graphite facing plates 221 that are secured to the door backing plate 136 by fastening elements 222. The door facing plates 221 are provided with thickened, tapered portions 223 along the sides thereof that project into the most intense portions of the beam when the doors are closed, which portions are adapted to overlie a portion only of the widths of the adjacent electrodes 187, respectively, in slightly spaced relation with respect thereto. Thus, when the doors are closed, the pockets 192 are shielded against the admission of ions thereto, but a substantial portion of each electrode 187 is exposed to the appropriate beam. Under these conditions, the currents to the electrodes 187 provide indications of the condition of the beams and the accuracy of focus thereof, and the beams may, therefore, be adjusted and accurately focused before the doors are opened for reception of $U^{235}$ ions in the pockets 192.

When, for example, $UCl_4$ is employed as charge material for the source unit 23, the side bands 44 of $U^{238}Cl^+$ ions are rather intense. Because of the particular spacing chosen for the two beam projecting mechanisms at the source unit 23, the side band of the beam focused on the receiver 40 bombards the door 48 of the adjacent receiver 41 when this door is in its open position, and a considerable portion of the neutralized particles scattered from this door 48 travel toward the $U^{235}$ slot 191 of the receiver 40. To prevent undue contamination of material collected in the $U^{235}$ pocket 192 of the receiver 40 by material scattered from the door 48 of the adjacent receiver 41, a baffle 224, partially supported by a block 226, is secured to this door by fastening elements 227 in such a position (see Fig. 2) that the baffle will intercept most of the ions that scatter from this door toward the $U^{235}$ slot 191 of the adjacent receiver 40.

Any desired arrangement of flexible water-cooling lines (not shown) may be brought into the liner 30 from outside the tank 20 through the conduit 37 and to the receiver housings 47 for cooling the parts of the receivers subjected to intense ion bombardment. Since examples of the arrangement of suitable water-cooling lines for this purpose are disclosed in certain of the above-mentioned copending applications, and since the provision of a suitable cooling system forms no part of the present invention, further complication of the drawings and the inclusion of additional description herein to disclose such a system in the instant application did not appear to be advisable.

As noted above, it is contemplated that the currents flowing to the electrodes 187 of the two receivers be metered to determine the accuracy of alignment of the receivers with the beams respectively received thereby. However, abnormal conditions of the beams, due, for example, to faulty operation of the source unit 23, occasionally make it highly desirable visually to observe the impingement of the beams upon the viewing faces 46 of the receivers or upon the closed doors 48 thereof. As the beams travel from the source unit 23 to the receivers, there are many collisions between beam particles and residual gas particles, even at tank pressures as low as $10^{-5}$ mm. of Hg, which collisions cause ionization of the residual gas particles. Such ionization produces a bluish violet luminosity. As a result of this luminosity, a beam appears to be visible along its entire path. Also, where a beam impinges upon a face plate or other parts of a receiver, the bombarded areas are heated to incandescent temperatures, and the glowing of the bombarded areas is clearly visually distinguishable from adjacent areas that are relatively free from bombardment. By providing a suitable unobstructed viewing path to the inside of the liner 30 from outside the tank 20, the size, shape, and position of the beam and the areas of the viewing faces 46 subjected to intense bombardment thereby may be clearly visually observed. However, because the calutron tank is mounted between the poles of a large electromagnet, and, for commercial scale operations, batteries of calutrons are employed in various closely spaced arrangements (see the copending application of Ernest O. Lawrence, Serial No. 571,420, filed January 5, 1945), only the removable face plates 24 of the tanks are generally readily accessible to the operators of the machines. With this limitation in mind, provision has been made for enabling an operating standing in front of the tank face plate 24 to look into the tank and observe the viewing faces 46 of the receivers 40 and 41.

To permit visual observation of the receiver viewing faces in this manner, an aperture 231 is provided in the liner end wall 31, and another aperture 232 is provided in the tank face plate 24 in alignment with the aperture 231. A short tube 233 is welded on the tank face plate 24 in registry with the aperture 232 and projecting outwardly therefrom. A suitable frame 234 is welded to the projecting end of the tube 233 for mounting a transparent plate 236, preferably of lead glass, over this end of the tube in a manner providing an air-tight seal between the plate and the tube. To protect the interior surface of the transparent plate 236 from becoming coated and rendered opaque as a result of bombardment by beam particles, a shutter 237 is pivotally mounted inside the frame 234 on a rotatable shaft 238, one end of which projects through the frame and through a small Wilson seal 239 therein and terminates in a control knob 241 by which the shutter may be manually moved about the shaft 238 to a position shown in dotted lines in Fig. 2. The transparent plate 236 is preferably made of lead glass for shielding an observer from gamma rays produced inside the tank.

A mirror 242 is mounted in a protecting metal frame 243 that is carried by a horizontally disposed shaft 244. This shaft is adapted to be rotated for swinging the mirror from a protected position (shown in Fig. 2) to one or the other of two positions indicated in that figure by dotted lines radiating from the shaft 244, whereby an image of the viewing face 46 of either of the two receivers may be reflected through the transparent plate 236 to an observer's eye. For this purpose, the shaft 244 is journaled in a suitable frame 245 that is carried by and projects from one wall of the liner 30. For rotating the shaft 244 (see Figs. 2, 14, and 15), a pinion 246 is mounted thereon in mesh with a gear 247 on a parallel idler shaft 248. The idler shaft 248 carries a beveled pinion 249 driven by a beveled gear 250 mounted on one end of a shaft 251 that extends rearwardly toward the liner end plate 31. The shaft 251 is journaled at its forward end in the frame 245 and at its rearward end in another frame 252 that is mounted on the liner end wall 31. At the rearward end of the shaft 251,, a beveled pinion 253 is secured thereto in mesh with an idler beveled gear 254, and the idler gear 254 is driven by another beveled gear 255 mounted on the upper end of a short vertically disposed shaft 256. The vertically disposed shaft 256 passes through a wall of the liner 30 and terminates at its lower end in a beveled pinion 257. The beveled pinion 257 is driven by a beveled gear 258 on a short horizontally disposed shaft 259 that is journaled in a lug 261 projecting from the liner 30 and that terminates at its rearward end to a universal joint 262. The universal joint 262 is secured to one end of a ceramic insulator 263, and the opposite end of the insulator is secured to a second universal joint 264 by which an extension **259*a* of the shaft 259 is connected in driving relation to the above described gear train. The extension 259*a* of the shaft 259 projects through a Wilson seal 266 mounted in the tank face plate 24 and terminates outside the tank 20 in a control knob 267 by which the above described interconnecting series of shafts and gears may be manually rotated to swing the mirror 242** back and forth between its inoperative position and its two operative positions.

An additional shutter 268 is pivotally mounted inside the liner 30 on a horizontally disposed shaft 269 for swinging movement from a position closing the aperture 231 in the liner end wall 31, as shown in Fig. 2, to one or the other of two positions uncovering this aperture and shown in dotted lines in Fig. 2. The shaft 269 is operatively connected to the idler gear 254 by means of a gear 271 and pinion 272 for swinging the shutter 268 through approximately 90° or more when the mirror 242 is swung from its inoperative position to its first or second operative position.

A suitable form of stop mechanism 273, that may be supported on a bracket 274 clamped around the Wilson seal 266, is associated with the shaft **259*a* for limiting rotation of this shaft between positions corresponding to the various positions to be assumed by the mirror 242. This stop mechanism may comprise a pin 276 mounted on the bracket 274 and urged by a spring 277 against the rim of a wheel 278 that is mounted on the shaft 259*a*. The wheel may be provided with an integrally formed shoulder 279 serving as one stop and an adjustable stop 281 secured to the rim of the wheel by fastening elements 282. The disposition of the stops on the wheel and of the wheel on the shaft are such that the pin 276 stops rotation of the shaft at positions corresponding to the inoperative position and the second operative position of the mirror 242**.

With the various parts of the calutron assembled in accordance with the foregoing description, the tank 20 is evacuated through the pump-out conduit 22, and the beams are struck and their common accelerating voltage adjusted so as to maximize the current to the electrode 187 of the receiver 41, the doors 48 of both receivers being closed. The receiver 41 is then adjusted by moving it horizontally until the optimum position of this receiver is achieved, such horizontal movement being controlled by rotation of the hand wheel 181 of the associated receiver adjusting mechanism. The receiver 40 is then positioned with respect to the beam to be received thereby by first adjusting the vertical position of the receiver by appropriate rotation of the spoked hub 134 until a maximum current to the electrode 187 of this receiver is obtained. The horizontal position of the receiver 40 is then adjusted by appropriate rotation of the hand wheel 181 of the associated receiver adjusting mechanism until the optimum position of this receiver is achieved as indicated by the current to the electrode 187. When both receivers have been properly positioned in this manner, their doors 48 may then be opened by rotation of the respectively associated hand control knob 169, whereby a selected, delimited portion of the $U^{235}$ component of each beam is admitted into the pocket 192 of the receiver upon which it is focused.

As desired, during a collection run or during the focusing operations, the receiver viewing faces may be observed through the transparent plate 236 by opening the shutter 237 and by properly positioning the mirror 242 through manipulation of the control knob 267. As will be noted from the description of the mirror positioning mechanism, the shutter 268 in the liner end wall 31 is automatically opened when the mirror is moved to either one of its operative positions. As is apparent from Fig. 2, however, it is possible to observe the viewing face 46 of the receiver 40 only when the door 48 of the receiver 41 is closed, so that collection by the receiver 41 must be interrupted during a run if observation of the viewing face of the receiver 40 is desired. Since the $U^{238}Cl^{+}$ side band 44 of the beam focused on the receiver 41 arrives in the vicinity of the mirror 242, and since scattered particles from other portions of the two beams also arrive in the vicinity of the mirror in considerable quantity, it is preferable that the mirror be kept in its protected inoperative position except when its use is required, in order that the mirror surface will not become coated with a deposit of de-ionized beam particles.

While a specific embodiment of the invention has been described in detail, it is to be understood that this has been done for illustrative purposes and that the invention is not limited thereby except as may be required by the appended claims.

What is claimed is:

1. In a calutron including a tank and means for transmitting a plurality of ion beams within the tank toward respective spaced-apart regions of focus, a receiver supporting structure disposed within the tank, a plurality of ion receivers corresponding in number to the number of said beams, said receivers being mounted on said structure in laterally spaced apart side-by-side relation for respectively intercepting selected portions of said beams adjacent said regions of focus, means for effecting limited longitudinal movement of each of said receivers along the general direction of travel adjacent its region of focus of the beam to be intercepted thereby, and means for varying the lateral spacing of said receivers.

2. In a calutron including a tank and means for transmitting a plurality of ion beams within the tank toward respective spaced-apart regions of focus, a receiver supporting structure disposed within the tank, a plurality of ion receivers corresponding in number to the number of said beams, said receivers being mounted on said structure in laterally spaced apart side-by-side relation for respectively intercepting selected portions of said beams adjacent said regions of focus, means for effecting independent limited longitudinal movement of each of said receivers along the general direction of travel adjacent its region of focus of the beam to be intercepted thereby, and means for varying the lateral spacing of said receivers.

3. In a calutron including a tank and means for transmitting a pair of ion beams within the tank along intersecting arcuate paths toward respective regions of focus, a receiver supporting structure disposed within the tank, a pair of ion receivers mounted on said structure and adapted to be respectively disposed in the paths of said beams adjacent their regions of focus for intercepting selected portions thereof, means associated with said structure for moving each of said receivers longitudinally along the general direction of travel of the beam to be intercepted thereby, and means associated with said structure for moving one of said receivers toward and away from the other.

4. In a calutron including a tank and means for transmitting a pair of ion beams within the tank along intersecting arcuate paths toward respective regions of focus, a receiver supporting structure disposed within the tank, a pair of ion receivers mounted on said structure and adapted to be respectively disposed in the paths of said beams adjacent their regions of focus for intercepting selected portions thereof, means associated with said structure for independently moving each of said receivers longitudinally along the general direction of travel of the beam to be intercepted thereby, and means associated with said structure for moving one of said receivers toward and away from the other.

5. In a calutron including a tank and means for transmitting a pair of ion beams within the tank along intersecting arcuate paths toward respective spaced-apart regions of focus, a receiver supporting structure disposed within the tank, a pair of ion receivers adapted to be respectively disposed in the paths of said beams adjacent their regions of focus for intercepting selected portions thereof, one of said receivers being mounted on said supporting structure for limited movement along the general direction of travel at its region of focus of the beam to be intercepted thereby, and the other of said receivers being mounted on said supporting structure for limited independent movement along the general direction of travel adjacent its region of focus of the other beam and for limited movement toward and away from the other receiver.

6. In a calutron, an ion receiver including an ion receiving pocket and a swinging type door therefor mounted on the receiver for pivotal movement between open and closed positions, and a baffle positioned on said door for intercepting beam particles to prevent scattering thereof from the door.

7. In a plural beam calutron, a first ion receiver for one beam, said first receiver including an ion receiving pocket and a swinging type door mounted on the receiver for pivotal movement between an inoperative position and a position closing said pocket against the admission of ions, and a baffle positioned on said door for intercepting beam particles traveling in a predetermined portion of a second beam to prevent scattering of said particles from the door toward a second receiver for said second beam.

8. In a plural beam calutron including a tank, means for transmitting a pair of ion beams within the tank toward respective adjacently disposed regions of focus, and a pair of receivers respectively disposed in side-by-side relation adjacent said regions of focus and having respective beam delimiting means disposed in the paths of the beams for passing selected portions thereof into ion receiving pockets; a pair of doors respectively pivotally mounted on said receivers for swinging movement between inoperative and shielding positions with respect to said beam delimiting means, and a baffle mounted on the door of one of said receivers for intercepting beam particles that would otherwise be scattered from the associated door when in its inoperative position toward the adjacent receiver.

References Cited in the file of this patent

UNITED STATES PATENTS

| | | |
|---|---|---|
| 2,221,467 | Bleakney | Nov. 12, 1940 |
| 2,341,551 | Hoover, Jr. | Feb. 15, 1944 |
| 2,470,745 | Schlesman | May 17, 1949 |